United States Patent [19]

Fehrenbacher

[11] E Re. 31,073

[45] Reissued Nov. 2, 1982

[54] ELECTROMECHANICAL CLOCK

[75] Inventor: Wolfgang Fehrenbacher, St. Georgen, Fed. Rep. of Germany

[73] Assignee: Kieninger & Obergfell Fabrik fur Technische Laufwerke und Apparate, St. Georgen, Fed. Rep. of Germany

[21] Appl. No.: 959,004

[22] Filed: Nov. 9, 1978

Related U.S. Patent Documents

Reissue of:

[64] Patent No.: 3,990,226
Issued: Nov. 9, 1976
Appl. No.: 513,050
Filed: Oct. 7, 1974

[30] Foreign Application Priority Data

Oct. 6, 1973 [DE] Fed. Rep. of Germany ..... 2350340

[51] Int. Cl.[3] ..... G04B 15/00; G04B 17/02

[52] U.S. Cl. ..... 368/134; 368/180

[58] Field of Search ..... 58/29, 130 R, 130, 123, 58/124, 130 A, 131; 368/134–137, 165, 179–181

[56] References Cited

U.S. PATENT DOCUMENTS

| | | | |
|---|---|---|---|
| 1,522,099 | 1/1925 | Brigden | 58/123 |
| 3,798,891 | 3/1974 | Sovenyhazi | 368/136 |
| 3,802,181 | 4/1974 | Marquis | 58/129 |

FOREIGN PATENT DOCUMENTS

| | | |
|---|---|---|
| 1717229 | 2/1956 | Fed. Rep. of Germany . |
| 7104328 | 5/1971 | Fed. Rep. of Germany . |

OTHER PUBLICATIONS

Utility Model Publication No. 18774/1964, 7/3/1964, Japan Shimizu.

*Primary Examiner*—Vit W. Miska
*Attorney, Agent, or Firm*—Karl F. Ross

[57] ABSTRACT

A timepiece with an electrodynamically controlled clockwork has a torsion pendulum intermittently coupled through a gear train with the clockwork for the maintenance of its oscillations. The gear train includes a first pinion mounted on a weighted rocker tending to hold it in mesh with a driving gear actuated by the clockwork; the torsion spring of the pendulum carries near its suspension point a horizontal spur receivable in a slot of a stationary mounting member so as to come periodically to rest on a slot edge, this spur being engageable in its arrested position by a hump on a cam disk entrained by a second pinion which meshes with the first pinion and decouples the latter from the associated gear against the countervailing force of the rocker weight as long as the spur is immobilized. When the spur-biasing force of the torsion spring changes direction, the gear train is re-established and the spur receives an impetus from the engaging hump as it moves away from the arresting slot edge.

22 Claims, 8 Drawing Figures

Fig. 5c
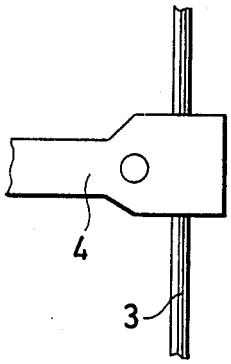
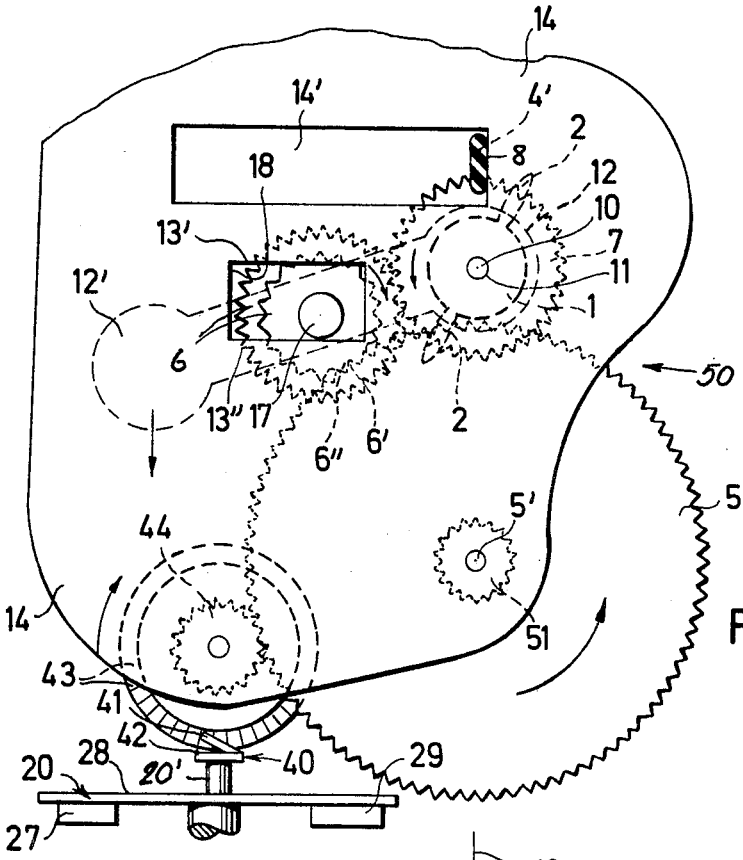
Fig. 5a
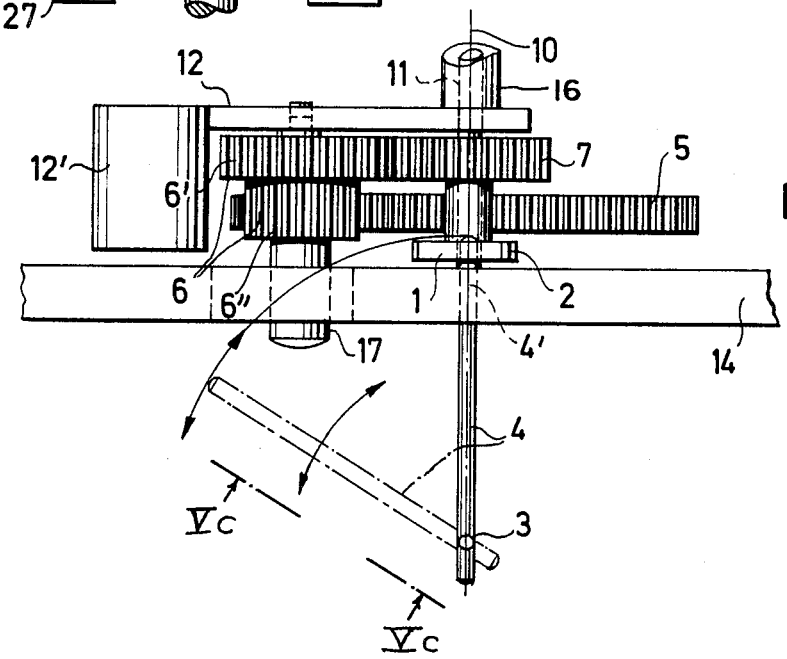
Fig. 5b

ELECTROMECHANICAL CLOCK

Matter enclosed in heavy brackets [ ] appears in the original patent but forms no part of this reissue specification; matter printed in italics indicates the additions made by reissue.

*This application is a reissue of U.S. Pat. No. 3,990,226.*

FIELD OF THE INVENTION

The present invention relates to a timepiece provided with an electrodynamically controlled clockwork and a torsion pendulum.

BACKGROUND OF THE INVENTION

Torsion pendulums, which have oscillatory cycles on the order of tens of seconds, have been used in the art of chronometry for a long time. The large time constants of these torsion pendulums minimize their energy consumption so that spring-loaded clocks of this type can be operated for a long period without rewinding. In electrically powered clockworks their current consumption is minimal.

This low energy consumption, on the other hand, makes such a clockwork sensitive to impact [timepiece;] *or* vibration and also requires a level base for the [timpiece] *timepiece*; thus, clocks of this type are liable to operate irregularly or to stop prematurely. Even with precision manufacture, they are difficult to calibrate properly in order to keep time with a reasonable degree of accuracy.

Nevertheless, timepieces with torsion pendulums have found wide public acceptance presumably due to the esthetic appeal and nerve-soothing effect of a pendulum weight oscillating with a slow rhythm about a vertical axis. The pendulum weight itself is usually of ornamental design, frequently comprising a pair of intersecting arms carrying metal balls at their ends.

Thus, it has already been proposed to equip a timepiece with a normal clockwork and a torsion pendulum. If the pendulum is provided with its own stepping mechanism independent of the functional clockwork, such as a Graham escapement, the timpeiece becomes complex and correspondingly expensive. Earlier suggestions for an operative coupling between the clockwork and the torsion pendulum, however, entail various drawbacks. According to German published specifications Nos. 1,798,274 and 1,936,654, for example, the clockwork is controlled by an escapement of the sling-drive type whose oscillating weight acts upon the torsion spring of the pendulum through a coupling between that spring and the sling mounting. The interaction between two systems of different natural frequencies generates interference phenomena which may arrest the pendulum and also can adversely affect the operation of the clockwork itself, in the absence of special synchronization circuits as disclosed in the second one of these publications. A contactless magnetic coupling between the clockwork and the torsion pendulum, as described in German published specification No. 2,058,037, avoids some of these difficulties but requires a strong magnetic field in its practical realization, with a correspondingly bulky structure. Moreover, such magnetic couplings are not practical with electrodynamically driven clockworks which are susceptible of malfunction caused by stray magnetic flux and which therefore require high-precision workmanship.

OBJECTS OF THE INVENTION

The general object of this invention, therefore, is to provide a compact, simple and reliable timepiece of the character referred to which avoids the aforestated disadvantages.

A more particular object is to provide a clockwork with a stepping drive for a torsion pendulum which can be operated by an electrodynamic escapement realizable with integrated circuitry.

SUMMARY OF THE INVENTION

These objects are realized, pursuant to the present invention, by the provision of a mechanical transmission between a clockwork, powered by a source of electric energy, and the resilient element of a torsion pendulum whereby the latter can be periodically stepped, the transmission including decoupling means controlled by the flexible element for interrupting the power train therethrough during a predetermined phase of each oscillatory cycle of the pendulum for the purpose of periodic resynchronization.

Pursuant to a more particular feature of the invention, the mechanical transmission comprises a gear train including a driving gear, preferably on a relatively fast-moving shaft such as the one advancing the second hand of the timepiece, and two permanently meshing pinions, the first of these pinions being entrainable by the driving gear but being disengageable thereform by being journaled in movable mounting means such as a rocker pivoted to a stationary support for swinging about a horizontal axis. The position and sense of rotation of the two pinions are such that the first pinion, when entrained, tends to displace the engaged teeth of the second pinion toward the axis of the driving gear with resulting disengagement of the first pinion from that gear whenever the second pinion is halted. The rocker carrying the first pinion is biased, e.g. by gravity, in a sense tending to maintain that pinion in mesh with the driving gear; the swing of the rocker may be limited by a cutout in the fixed support receiving the shaft of the first pinion. The resilient element or torsion spring of the pendulum is formed with an extension, advantageously a horizontal spur secured to it (e.g. by molding) near its fixedly anchored upper end, which oscillates with that spring and [in] *is* intermittently engageable by a formation on a driven member positively coupled with the second pinion. Once during each pendulum cycle the spur engages a fixed stop, e.g. an edge of a horizontal slot in the rocker support, so as to be immobilized for a time interval preferably approximating half an oscillatory period; during this standstill period the coacting formation of the driven member—specifically a hump of a cam disk—comes into contact with the spur whereby the second pinion is arrested and the first pinion is retracted from the driving gear until the spur is released on the return swing of the pendulum.

The rocker, the pinions and the cam disk advantageously consist of plastic material in order to be of light weight and have a low moment of inertia.

BRIEF DESCRIPTION OF THE DRAWING

The above and other features of the invention will now be described in detail with reference to the accompanying drawing in which:

FIG. 5a is an enlarged rear view of some of the components seen in FIG. 1;

FIG. 5b is a top view of the components of FIG. 5a, drawn to the same scale;

FIG. 5c is a detail view as seen on the line Vc—Vc in FIG. 5b; and

SPECIFIC DESCRIPTION

Figures 1, 2:
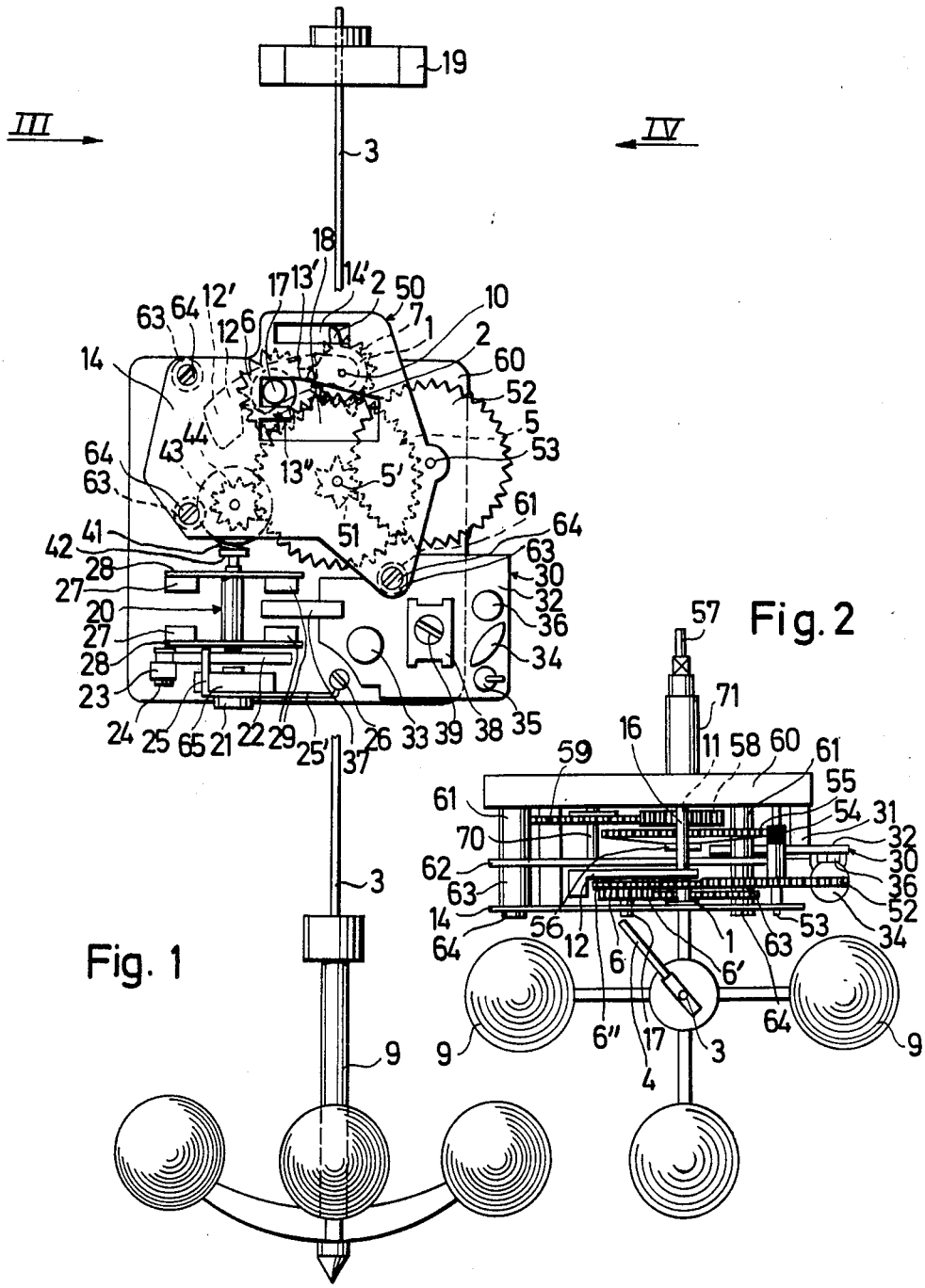
FIG. 1 is a rear elevational view of a clockwork and stepping drive of a timepiece equipped with a torsion pendulum according to the invention.
FIG. 2 is a top view of the assembly of FIG. 1.
Figure 3:
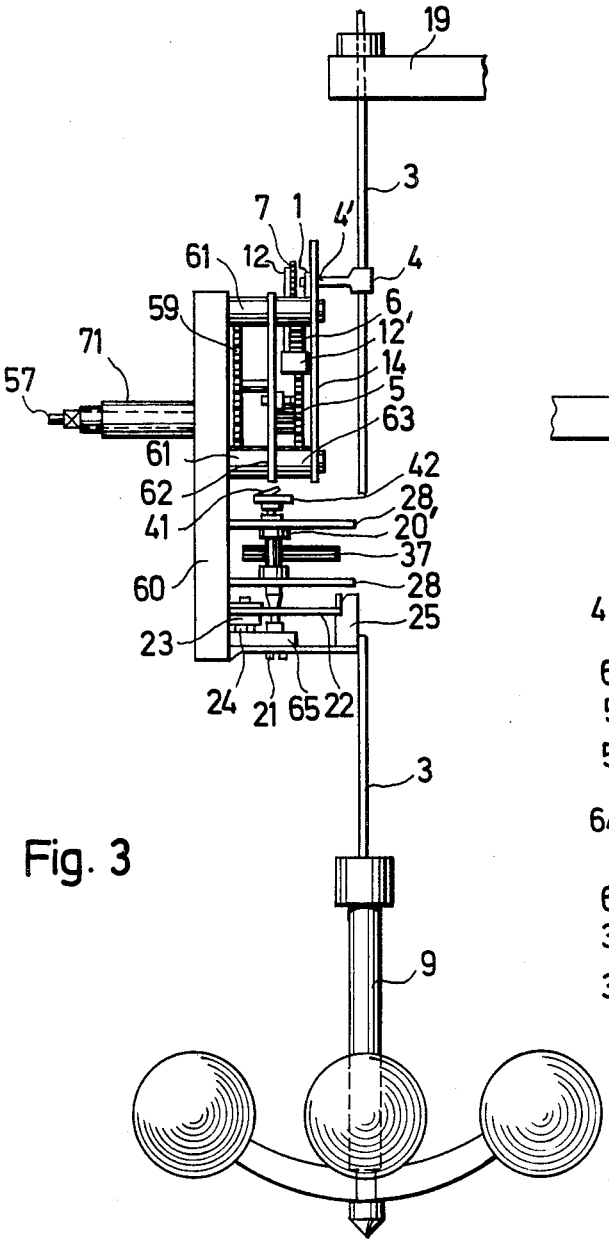
FIGS. 3 and 4 are side-elevational views as seen in the directions of arrows III and IV, respectively, in FIG. 1.
Figure 4:
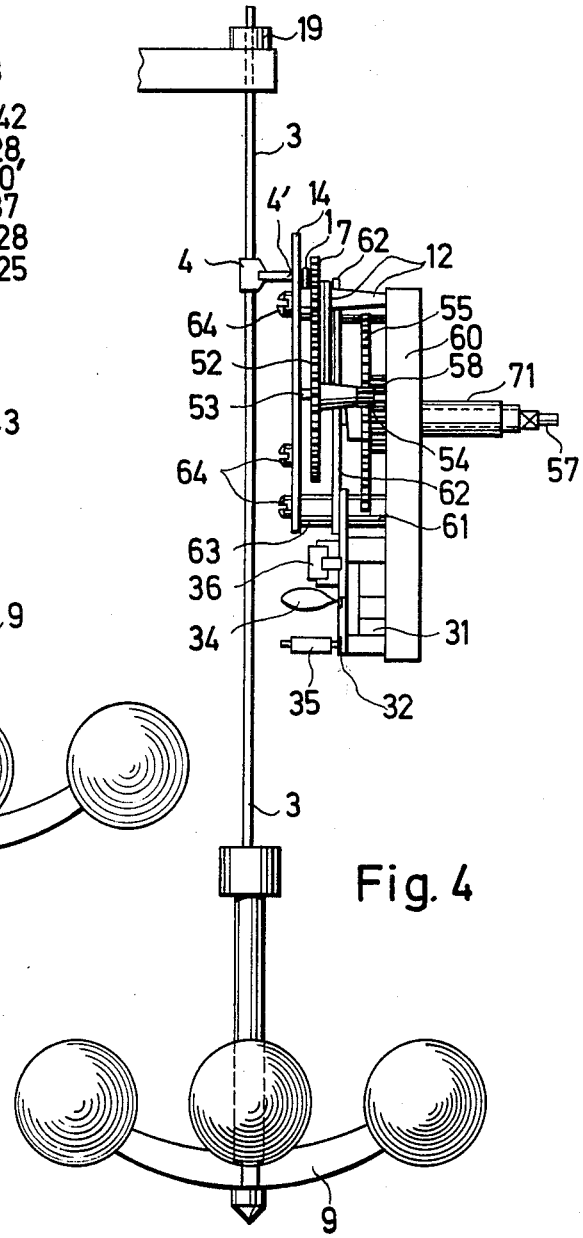

In FIGS. 1–5c there is shown an upright supporting plate 60 rigid with a nonillustrated clock housing. Plate 60 carries stepped rods 61 which pass through an intermediate plate 62 and a back plate 14 spaced apart by sleeves 63 and held in position by screws 64. A balance wheel 20 has a shaft 20' journaled between bearing screws 21 (only one shown) threaded into a lower lug 65 and a nonillustrated upper lug both projecting rearwardly from plate 60. Balance wheel 20 comprises the usual spiral spring 22 which is fastened by a screw 24 to a lug 23 also carried on the rear face of plate 60. The other end of spring 22 is anchored to a lever 25 which is fulcrumed on screw 21 and whose opposite end 25' engages in the threads of an adjusting bolt 26 screwed into plate 60. Balance wheel 20 comprises a pair of parallel horizontal disks 28 carrying two oppositely polarized permanent magnets 27 as well as a pair of diametrically opposite counterpoises 29. The electrodynamic actuation of balance wheel 20 with the aid of magnets 29 will be described hereinafter with reference to FIG. 6.

Balance wheel 20 is part of a clockwork which also includes stepping means 40 for the advance of the clock hands (not shown), comprising a resilient pawl 41 which is mounted on a head 42 of shaft 20' and coacts with a ratchet 43 for clockwise rotation as viewed in FIG. 5a. Ratchet 43 is rigid with a pinion 44 which is journaled in back plate 14 and meshes with a gear 5 driving the second hand (not shown) of the clock. Ratchet 43 is periodically arrested by a nonillustrated retaining pawl in the well-known manner.

Gear 5, keyed to the drive shaft 5' for the second hand (not shown), is rigid with a pinion 51 driving a gear 52 whose shaft 53 is journaled in plates 14 and 60. Gear 52, preferably made of plastic material, drives via a pinion 54 a gear 55 which is coupled through a friction clutch 56 with a central shaft 57 carrying the nonillustrated minute hand, this shaft being journaled in plates 60 and 62. A pinion 58, rigid with gear 55, engages a reversing gear 59 whose shaft 70 is also journaled in plates 60 and 62; the forward end of shaft 70 extends into a nonillustrated front recess of plate 60 where it meshes with another reversing gear, not shown, to drive a tubular shaft 71 for the hour hand coaxial with minute shaft 57.

A post 31, integral with one of the mounting rods 61, carries a microelectronic module 30 which comprises a printed base plate 32, capacitors 33 and 34, a resistor 35 and an integrated-circuit chip 36. A contact spring 38, serving to complete certain internal connections of module 30, is engaged by a screw 39 which passes through the base plate 32 and secures it to the post 31. Plate 32 supports an electromagnetic yoke 37 projecting into the path of magnets 29. Further details of this circuitry will be described below with reference to FIG. 6. Current is supplied to the module 30 via a nonillustrated lead connected to the forwardly projecting end of the metallic mounting screw 39 which, of course, is well insulated with reference to grounded metallic parts of the system; the other supply terminal is constituted by the grounded clock housing.

In accordance with the present invention, a torsion pendulum 9 is suspended on a resilient elongate element 3 (referred to hereinafter as a torsion spring) whose upper end is clamped in a fixed spring mounting 19. This torsion pendulum is linked with the clockwork 20, 40 via a gear train, generally designated 50, which comprises a pair of pinions 6, 7 as well as the secondhand gear 5. Pinion 6 is mounted on a shaft 17 which is journaled in a rocker 12 having a free end loaded down by a weight 12', the shaft 17 projecting into a cutout 18 of plate 14. The upper and lower edges 13' and 13'' of this cutout limit the swing of the rocker about a horizontal axis 10 defined by a shaft 11 journaled in plates 14 and 60, rocker 12 having a hub 16 surrounding this shaft. A cam disk 1 carried on shaft 11 has two diametrically opposite humps 2 positioned to coact with an end 4' of a spur 4 which, as best seen in FIG. 5c, is rigid with torsion spring 3; this spur advantageously consists of a resinous casting directly molded on the spring 3 at a location a small fraction of its length below mount 19. The end 4' of spur 4 is receivable in a horizontal slot 14' of plate 14 where it comes to rest against a stop 8 formed by an edge of that slot substantially in line with shaft 11; it is only in the vicinity of this edge that the humps 2 may contact the spur 4. Thus, torsion spring 3 biases the spur 4 against the stop 8 during part of a pendulum cycle, with a force effective in a clockwise sense as viewed in FIG. 5b; during the remainder of the cycle that force is reversed and disengages the spur from the stop.

Pinion 6 is stepped and has two toothed portions 6' and 6'' of larger and smaller diameter, respectively. Toothed portion 6' permanently meshes with pinion 7; toothed portion 6'' is urged by the weight 12' into engagement with driving gear 5 by which it is set in clockwise rotation as viewed in FIG. 5a. With pinion 7 rotating counterclockwise, the contacting teeth of pinions 6 and 7 move toward the axis of gear 5 whereby pinion 7 exerts upon pinion 6 a reaction force tending to disengage it from gear 5. This reaction force is negligible as long as pinon 7 is free to rotate about its axis 10; when that rotation is stopped, however, by contact between a hump 2 of disk 1 and the spur 4 arrested by stop 8 as described hereinafter, pinion 6 rides up the periphery of pinion 7 under the driving force of gear 5, against the countervailing effect of weight 12', until its portion 6'' no longer engages the teeth of gear 5. With elements 1, 5, 6, 7 and 12 made of light-weight plastic material, this disengagement proceeds with little friction and without generation of objectionable noise.

Figure 6:
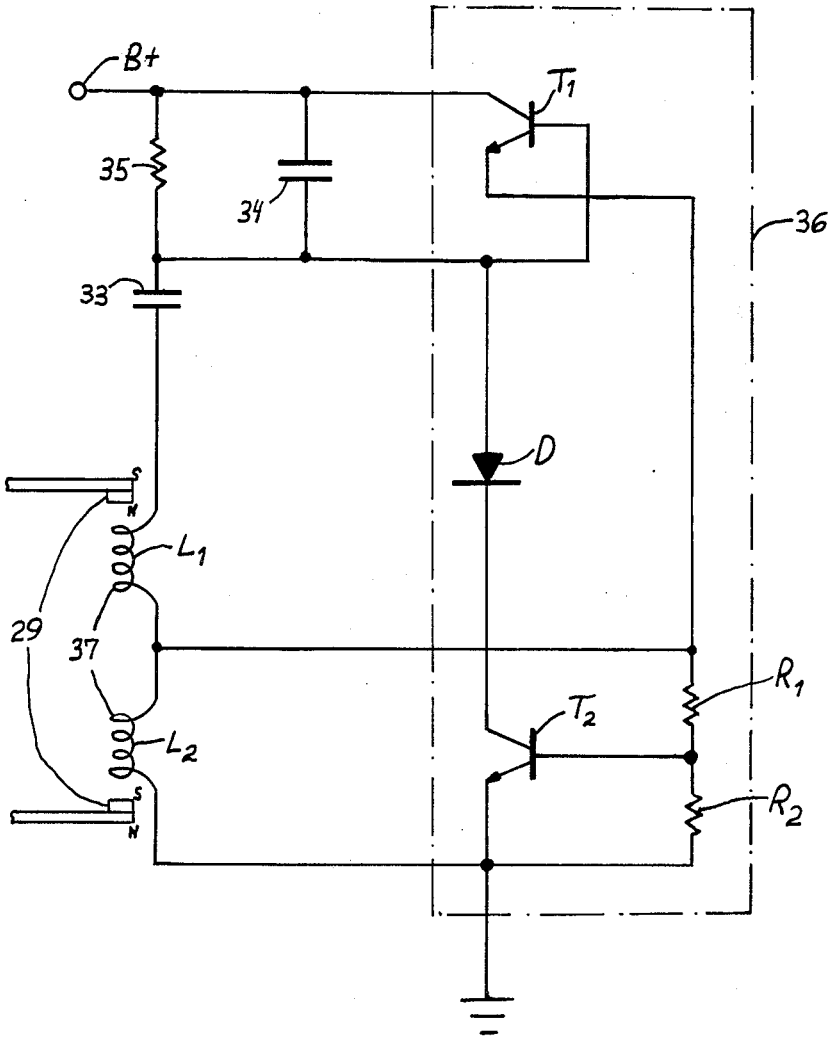
FIG. 6 is a circuit diagram of an electrodynamic escapement for the clockwork of FIG. 1.

The electrodynamic escapement drive for the clockwork 20, 40 has been shown in FIG. 6. Chip 36 comprises two NPN transistors $T_1$, $T_2$, a diode D, and a voltage divider formed by a pair of resistors $R_1$, $R_2$. Yoke 37 is shown to comprise a pair of coils $L_1$, $L_2$ connected in series with capacitor 33 and resistor 35 between a positive bus bar B+ and ground; resistor 35 is shunted by capacitor 34. Transistor $T_1$, whose collector is tied to bus bar B+, has its base connected to the junction of impedances 33–35 and, via diode D, to the collector of transistor $T_2$ whose emitter is grounded. The emitter of transistor $T_1$ is connected on the one hand to the junction of coils $L_1$, $L_2$ and on the other hand to ground via resistors $R_1$ and $R_2$ whose common terminal is tied to the base of transistor $T_2$.

When power is first connected to the system, capacitor 33 charges through resistor 35 and turns on the transistor $T_1$ to energize the coil $L_2$ along with the coil $L_1$ which is inductively coupled therewith. The simultaneous flow of charging current into capacitor 33, which is limited by the conductive condition of transistor $T_2$, is reversed upon the return swing of the magnets with resulting cutoff of both transistors. Capacitor 34 then charges until the magnetically induced reverse voltage disappears whereupon transistor $T_1$ conducts again and re-energizes the coils 37. The cycle is then repeated.

The foregoing explanation is given merely by way of example and is not material to the operation of the stepping mechanism for the torsion pendulum 9 which will now be described.

It will be assumed that torsion pendulum 9 has a neutral position in which the spur 4 just contacts the edge 8 of slot 14'. During the quarter-cycle in which the pendulum rotates in one direction (i.e. counterclockwise as viewed in FIG. 5b), from that neutral position, and during the subsequent return swing to that neutral position, this rotation is not impeded by the stop 8 and the natural frequency of the pendulum is determined by the full length of torsion spring 3; the half-cycle consisting of these two quarter-turns is therefore of slightly larger duration t' than the other half-cycle in which the spur 4 is stopped so that the slight foreshortening of spring 3 results in a higher natural frequency, corresponding to a shorter duration t''. The total oscillatory period is thus t'+t''.

The transmission ratio between gear 5 and pinion 7 is so chosen that cam disk 1 performs half a revolution in a time greater than t' but less than t'' so that one of its humps 2 will always engage the spur 4 resting against stop 8. Until the pendulum swings again through its neutral position, cam disk 1 is immobilized and therefore disconnects the pinion 6 from driving gear 5. Thus, the clockwork 20, 40 and the stepping drive 50 for the pendulum 9 are resynchronized at a precise point in each oscillatory cycle, this resynchronization being accompanied by a brief acceleration of spur 4 at the beginning of its counterclockwise swing (FIG. 5b) by an impetus from the engaging hump 2 which rolls on its end 4' and eventually becomes disengaged therefrom.

In principle, the neutral point of the pendulum oscillation could be so chosen that the spur 4 remains immobilized by the edge 8 for a longer or shorter fraction of a cycle. The arresting of this spur in mid-cycle, however, has the advantage of a smooth and virtually unnoticeable changeover between the two oscillating frequencies of the pendulum.

In a particularly advantageous embodiment, with a torsion pendulum performing a full oscillation in about 10 to 15 seconds, the elements of the gear train associated with the two-hump cam disk 1 were constructed as follows:

| | |
|---|---|
| driving gear 5 | 72 teeth |
| small-diameter portion 6' of pinion 6 | 22 teeth |
| large-diameter portion 6'' of pinion 6 | 20 teeth |
| pinion 7 | 20 teeth |

Since on standstill the spur 4 lies next to the stop 8 in a position from which it can be dislodged by a hump 2 upon incipient rotation of cam disk 1, no manual startup of the pendulum 9 is necessary when the clockwork is set in motion. The same clockwork can be used to drive two or more torsion pendulums, of mutually different natural frequencies, as long as the aforestated relationship between transmission ratio and oscillatory period is preserved.

I claim:

[1. In a timepiece, in combination:

a clockwork powered by a source of electric energy;

a nonfunctional torsion pendulum with an elongate resilient element having a fixedly anchored upper end and a freely rotatable weighted lower end; mechanical transmission means between said clockwork and said resilient element for periodically stepping said torsion pendulum; and decoupling means in said transmission means controlled by said resilient element for interrupting the power train therethrough during a predetermined phase of each oscillatory cycle of said torsion pendulum.]

2. [The combination defined in claim 1 wherein said] *In a timepiece, in combination:*

*a clockwork powered by a source of electric energy;*

*a torsion pendulum with an elongate resilient element having a fixedly anchored upper end and a freely rotatable lower end;*

*mechanical* transmission means [comprises] *comprising* a gear train including a driving gear positively coupled with said clockwork, a first pinion positioned adjacent said driving gear for entrainment thereby, movable mounting means for said first pinion enabling its disengagement from said driving gear, a second pinion meshing with said first pinion with a sense of rotation tending to disengage said first pinion from said driving gear upon a halting of said second pinion, biasing means for said mounting means tending to maintain said first pinion engaged with said driving gear, and a driven member positively coupled with said second pinion; [said] *and* decoupling means comprising an oscillatable extension of said resilient element, a formation on said driven member intermittently engageable with said extension, and stop means periodically engageable by said extension in [said] *a predetermined* phase of an oscillatory cycle, said extension lying in the path of said formation only in the vicinity of said stop means and resisting displacement by said formation while being urged by said resilient element against said stop means, *said mounting means comprising a rocker pivoted to a stationary support for swinging about a horizontal axis, said stop means being part of said support.*

[3. The combination defined in claim 2 wherein said mounting means comprises a rocker pivoted to a stationary support for swinging about a horizontal axis, said stop means being part of said support.]

4. The combination defined in claim [3] *2* wherein said extension comprises a horizontal spur secured to said resilient element near said upper end thereof for oscillation thereabout.

5. The combination defined in claim 4 wherein said stop means is an edge of a horizontal slot in said support periodically enterable by said spur.

6. The combination defined in claim 4 wherein said driven member is a cam disk, said formation being at least one hump on said cam disk.

7. The combination defined in claim 6 wherein said stop means substantially coincides with a vertical axial plane of said cam disk.

8. The combination defined in claim 7 wherein said horizontal axis lies in said vertical plane, said rocker being provided with a pivot pin carrying said cam disk.

9. The combination defined in claim 8 wherein said biasing means comprises a weight at an extremity of said rocker remote from said pivot pin, said first pinion being carried on said rocker at an intermediate location between said extremity and said axis.

10. The combination defined in claim 8 wherein said second pinion is mounted on said pivot pin and is rigid with said cam disk.

11. The combination defined in claim 10 wherein said first pinion is stepped and has two toothed portions of different diameter respectively meshing with said driving gear and with said second pinion.

12. The combination defined in claim 11 wherein the toothed portion meshing with said second pinion has the larger diameter.

13. The combination defined in claim 12 wherein said driving gear is substantially larger than said pinions.

14. The combination defined in claim 13 wherein said driving gear has 72 teeth, said toothed portions have 22 and 20 teeth, respectively, and said second pinion has 20 teeth.

15. The combination defined in claim 14 wherein said cam disk is provided with two diametrically opposite humps and said torsion pendulum has an oscillatory cycle of about 10 to 15 seconds.

16. The combination defined in claim 8 wherein said support is provided with a cutout, said first pinion being provided with a shaft received with play in said cutout for limiting the swing of said rocker.

17. The combination defined in claim 6 wherein said pinions, said rocker and said cam disk [consists] *consist* of plastic material.

18. The combination defined in claim 4 wherein said spur is a resinous casting on said resilient element.

19. The combination defined in claim 2 wherein said extension engages said stop means substantially in a midposition of a pendulum swing.

[20. The combination defined in claim 1 wherein said clockwork comprises an electrodynamic escapement.]

*21. In a timepiece, in combination:*

*a clockwork powered by a source of electric energy;*

*a torsion pendulum with an elongate resilient element having a fixedly anchored upper end and a freely rotatable lower end;*

*mechanical transmission means comprising a gear train including a driving gear positively coupled with said clockwork, a first pinion adjacent said driving gear for entrainment thereby, movable mounting means for said first pinion enabling its disengagement from said driving gear, a second pinion meshing with said first pinion with a sense of rotation tending to disengage said first pinion from said driving gear upon a halting of said second pinion, biasing means for said mounting means tending to maintain said first pinion engaged with said driving gear, and a driven member positively coupled with said second pinion; and*

*decoupling means comprising an oscillatable extension of said resilient element, a formation on said driven member intermittently engageable with said extension, and stop means periodically engageable by said extension in a predetermined phase of an oscillatory cycle, said extension lying in the path of said formation only in the vicinity of said stop means and resisting displacement by said formation while being urged by said resilient element against said stop means, said extension engaging said stop means substantially in a midposition of a pendulum swing.*

*22. In a timepiece, in combination:*

*a clockwork powered by a source of electric energy;*

*a torsion pendulum with an elongate resilient element having a fixedly anchored upper end and a freely rotatable weighted lower end, said resilient element being provided with a transverse spur secured thereto near said upper end for oscillation thereabout;*

*mechanical transmission means forming a power train between said clockwork and said resilient element for periodically stepping said torsion pendulum, said transmission means including a driving member positively coupled with said clockwork, a driven member having a formation intermittently engageable with said spur during a predetermined phase of each oscillatory cycle of said torsion pendulum, and a releasable coupling between said driving and driven members yieldable to interrupt said power train upon said driven member encountering a significant resistance; and*

*stop means in the path of said spur for arresting same during a predetermined fraction of each oscillatory cycle while allowing said torsion pendulum to complete the cycle at an accelerated rate resulting from a partial immobilization of said resilient element, said formation coacting with said spur during said fraction whereby said driven member encounters a resistance sufficient to release said coupling until said spur disengages said stop means following a reversal of the rotation of said torsion pendulum.*

*23. The combination defined in claim 22 wherein said stop means is positioned for engagement by said spur substantially in a midposition of an oscillatory swing of said lower end.*

*24. The combination defined in claim 23 wherein said driven member is a cam disk with a substantially horizontal axis, said formation being at least one hump on said cam disk, said stop means substantially coinciding with a vertical plane including said axis.*

*25. The combination defined in claim 22 wherein said clockwork comprises an electrodynamic escapement.*

* * * * *